United States Patent
Azami

(10) Patent No.: US 6,628,444 B2
(45) Date of Patent: Sep. 30, 2003

(54) SCANNING OPTICAL DEVICE AND IMAGE FORMING APPARATUS HAVING THE SAME

(75) Inventor: Junya Azami, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/905,900

(22) Filed: Jul. 17, 2001

(65) Prior Publication Data

US 2002/0021478 A1 Feb. 21, 2002

(30) Foreign Application Priority Data

Jul. 17, 2000 (JP) ........................................ 2000/215361

(51) Int. Cl.[7] .............................................. G02B 26/08
(52) U.S. Cl. ...................... 359/204; 359/216; 347/243
(58) Field of Search .................................. 359/196, 197, 359/204, 216, 217, 218; 347/243, 244

(56) References Cited

U.S. PATENT DOCUMENTS 6,049,408 A * 4/2000 Tada ........................ 347/233

* cited by examiner

*Primary Examiner*—Euncha Cherry
(74) *Attorney, Agent, or Firm*—Fitzpatrick, Cella, Harper & Scinto

(57) ABSTRACT

A scanning optical device has a first light source unit for generating a plurality of light beams, a second light source unit for generating at least one light beam, and a deflecting scanner for deflecting by a reflecting surface the light beams generated by the first and second light source units to scan a member to be scanned. The positions of the plurality of laser beams generated by the first light source unit are different from each other in a scanning direction in which the deflecting scanner scans, and the at least one light beam generated by the second light source unit is positioned between the plurality of light beams generated by the first light source unit in the scanning direction.

12 Claims, 6 Drawing Sheets

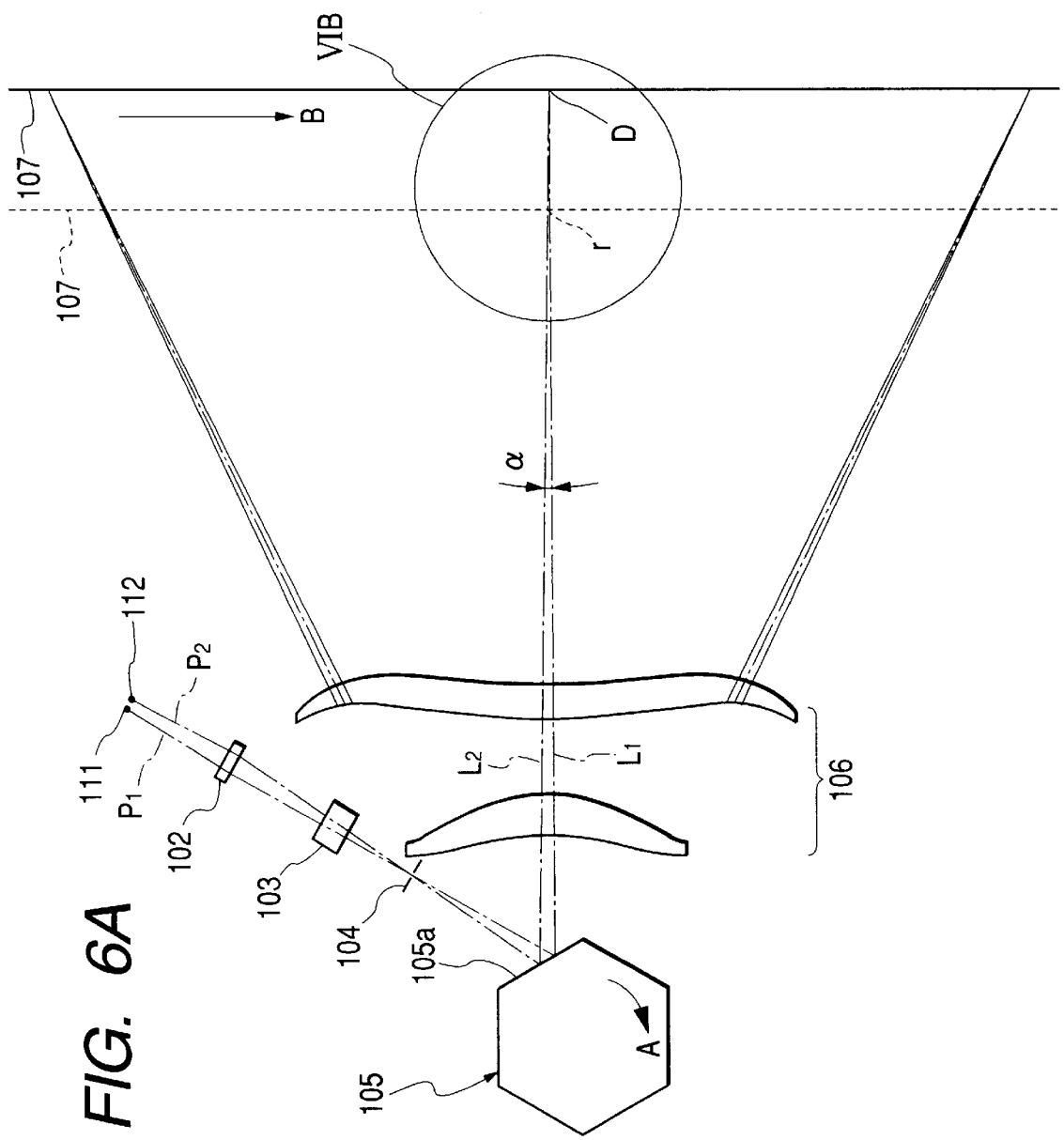
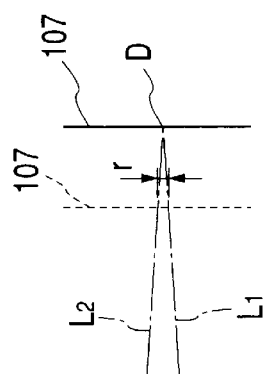

DEVICE AND IMAGE
SCANNING OPTICAL DEVICE AND IMAGE FORMING APPARATUS HAVING THE SAME

BACKGROUND OF THE INVENTION

1. Field of the Invention

The present invention relates to a multi-beam type of scanning optical device used in an image forming apparatus such as a laser beam printer or a digital copying machine.

2. Description of the Related Art

In recent years, multi-beam-type scanning optical devices capable of simultaneously writing a plurality of lines by using a laser light source having a plurality of light emitting points have recently been developed for use in electrophotograhpic apparatuses, e.g., laser beam printers.

This type of scanning optical device enables scanning with a plurality of scanning laser beams simultaneously used, as described below. For example, as shown in FIG. 6A, two laser beams $P_1$ and $P_2$ as light beams are emitted from two light-emitting points 111 and 112 of a multi-beam laser unit, are each collimated into a parallel beam by a collimator lens 102, pass through a cylindrical lens 103 and an optical stop 104, irradiate to a reflecting surface 105a of a rotary polygon mirror 105, and travel through an fθ lens system 106 to have an imaging point on a photosensitive member (photoconductor) 107 on a rotary drum.

Each of the two laser beams $P_1$ and $P_2$ incident upon the reflecting surface 105a of the rotary polygon mirror 105 is deflected by the mirror 105 to be scanned in a main scanning direction. Each beam moving in the main scanning direction by the rotation of the rotary polygon mirror 105 and moving in a sub-scanning direction by the rotation of the rotary drum forms an electrostatic latent image on the photosensitive member 107.

The cylindrical lens 103 condenses each of the laser beams $P_1$ and $P_2$ so that the beam is condensed into a linear shape on the reflecting surface 105a of the rotary polygon mirror 105. The cylindrical lens 103 and the fθ lens system 106 form an optical face tangle error correction system to perform the function of preventing occurrence of an error in positioning of the above-mentioned imaging point in the sub-scanning direction on the photosensitive member 107 due to a face tangle error of the rotary polygon mirror 105. Also, the fθ lens system 106 has the function of correcting the scanning movement of each beam so that the imaging point moves at a constant speed in the main scanning direction on the photosensitive member 107.

Writing with a plurality of beams $P_1$ and $P_2$ is thus performed to achieve high-speed, high-definition printing.

To reduce the spacing between the lines formed on the photosensitive member by the laser beams from the two light-emitting points of the laser unit, a method has been practiced in which the line connecting the two light-emitting points is set at an angle from a direction corresponding to the sub-scanning direction, that is, the two light-emitting points are shifted from each other in a direction corresponding to the main scanning direction, because there is a limit to the reduction between the distance between the two light-emitting points.

If the light-emitting points are positioned as described above, the necessary length of the reflecting surface 105a of the rotary polygon mirror 105 for simultaneously reflecting the plurality of beams $P_1$ and $P_2$ to perform scanning is increased, resulting in an increase in overall size of the rotary polygon mirror 105. As a solution of this problem, means for reducing the distance between the points at which the laser beams $P_1$ and $P_2$ are incident upon the rotary polygon mirror 105 has been devised. That is, the distance by which the laser beams $P_1$ and $P_2$ is reduced by reducing the distance between the rotary polygon mirror 105 and the optical stop 104 on the upstream side of the rotary polygon mirror 105. This arrangement is also effective in limiting a deterioration in image quality due to instability of focusing.

This arrangement will be described in more detail. The laser beam $P_1$ emitted from the light-emitting point 111 is deflected by the rotary polygon mirror 105, passes through the fθ lens system 106 and travels along a path $L_1$ to have an imaging point at a position D on the photosensitive member 107. At this time, the laser beam $P_2$ emitted from the light-emitting point 112 has an imaging point located just behind (or on the upstream side of) the position D in the main scanning direction indicated by an arrow B.

Thereafter, with rotation of the rotary polygon mirror 105 in the direction indicated by an arrow A (FIG. 6A shows the states of rotation of the rotary polygon mirror although the rotary polygon mirror is illustrated as if it is not rotated because the amount of rotation is extremely small), the laser beam $P_2$ emitted from the light-emitting point 112 travels along a path $L_2$ to reach the position D.

It is assumed here that the photosensitive member 107 moves to the position indicated by the broken line in FIG. 6A due to a reduction in the accuracy with which the photosensitive member 107 and the optical box incorporating the optical device are positioned. Since the laser beams $P_1$ and $P_2$ respectively emitted from the light-emitting points 111 and 112 reach the position D on the photosensitive member 107 with an angular difference of an angle "α" from each other, the positions of the imaging spots on the photosensitive member 107 of the laser beams $P_1$ and $P_2$ shown by a broken line traveling along the paths $L_1$ and $L_2$ are spaced apart from each other by a distance "r". FIG. 6B is a diagram showing details of the encircled portion VI B of FIG. 6A.

If the position of the optical stop 104 is brought closer to the rotary polygon mirror 105 to reduce the angle "α", the distance "r" between the imaging spots of the laser beams $P_1$ and $P_2$ on the photosensitive member 107, resulting from an error in positioning of the photosensitive member 107 as indicated by the broken line, is reduced. Thus, an increase in the length of the reflecting surface of the rotary polygon mirror and a deterioration in image quality resulting from an error in the imaging position due to instability of focusing can be suppressed.

However, if the number of scanning laser beams is increased, even the above-described technique is not a sufficiently effective solution of the problem of an increase in size of the reflecting surface for reflecting and scanning a plurality of laser beams, resulting in an increase in overall size of the polygon mirror and the problem of deterioration in image quality due to instability of focusing.

SUMMARY OF THE INVENTION

An object of the present invention is to provide a scanning optical device designed so as to prevent an increase in size of a deflecting scanning means due to an increase in length of a reflecting surface, and an image forming apparatus incorporating the scanning optical device.

Another object of the present invention is to provide a scanning optical device designed so as to prevent deterioration in image quality due to instability of focusing, and an image forming apparatus incorporating the scanning optical device.

Still another object of the present invention is to provide a scanning optical device and an image forming apparatus using the optical scanning device, the scanning device including a first light source unit for generating a plurality of light beams, a second light source unit for generating at least one light beam, and deflecting scanning means for deflecting by a reflecting surface the light beams generated by the first light source unit and the second light source unit to scan a member to be scanned, wherein the positions of the plurality of light beams generated by the first light source unit are different from each other in a direction corresponding to the direction of scanning performed by the deflecting scanning means on the reflecting surface of the deflecting scanning means, and the at least one light beam generated by the second light source unit is positioned between the plurality of light beams generated by the first light source unit in the direction corresponding to the scanning direction.

These and other objects and features of the present invention will become apparent from the following detailed description of preferred embodiments of the invention in conjunction with the accompanying drawings.

BRIEF DESCRIPTION OF THE DRAWINGS

FIG. 6A is a diagram showing a scanning optical device based on the related art;

FIG. 6B is a diagram showing details of an encircled portion VI B of FIG. 6A;

DESCRIPTION OF THE PREFERRED EMBODIMENTS

Embodiments of the present invention will be described with reference to the accompanying drawings.

Figure 7:
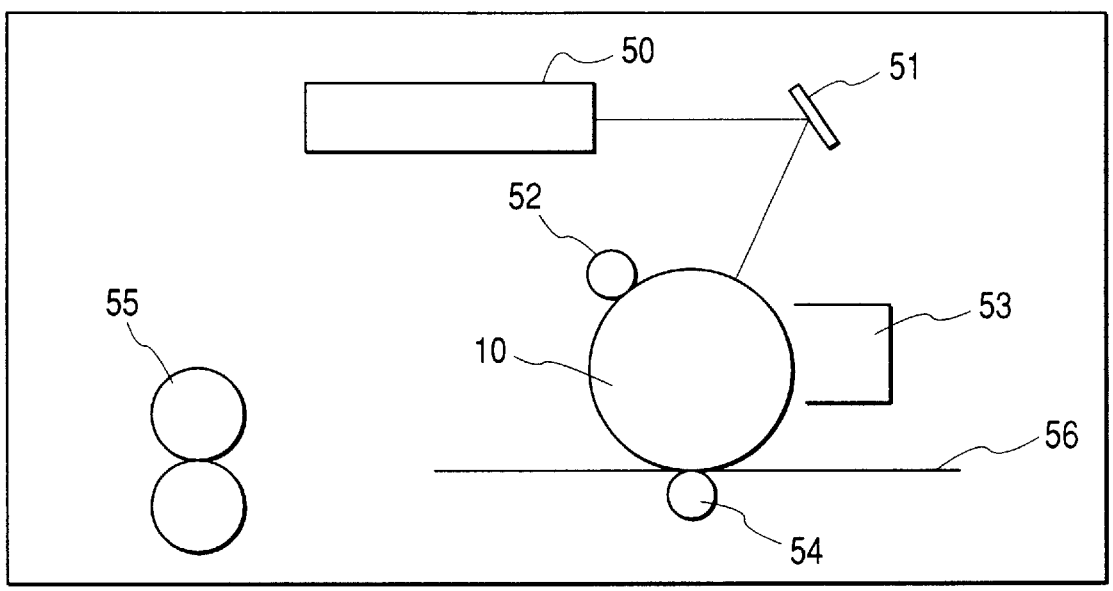
FIG. 7 is a diagram showing an image forming apparatus in which the scanning optical device in the embodiment of the present invention can be applied.

FIG. 7 is a diagram schematically showing an image forming apparatus in which a scanning optical device which represents an embodiment of the present invention is applied.

Referring to FIG. 7, the image forming apparatus includes a photosensitive member 10, a multi-beam scanning optical device 50, a mirror 51, a charging means 52, a developing means 53, a transfer means 54, a fixing means 55, and a sheet of paper 56 as a recording material.

The photosensitive member 10 is charged by the charging means 52 and is exposed to light beams by the scanning optical device 50 via the mirror 51. An electrostatic latent image is thereby formed on the photosensitive member 10. The electrostatic latent image on the photosensitive member 10 is visualized by the developing means 53 using toner. The toner image is transferred onto the recording material 56 by the transfer means 54. The recording material 56 bearing an unfixed toner image passes through the fixing means 55 such that the unfixed toner image is fixed on the recording material 56.

The multi-beam scanning optical device which represents an embodiment of the present invention will next be described.

Figure 1:
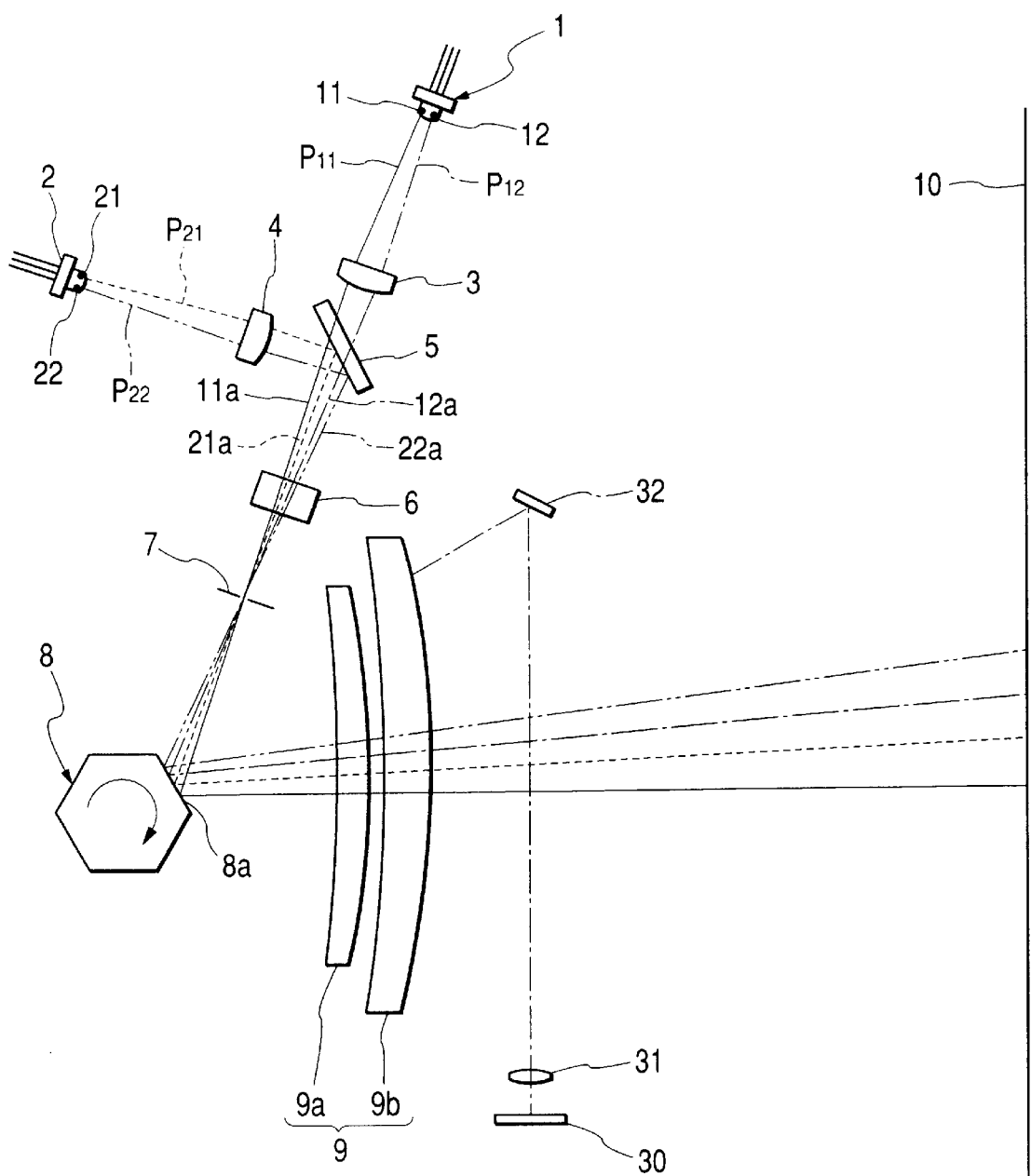
FIG. 1 is a diagram showing a scanning optical device which represents an embodiment of the present invention.

Referring to FIG. 1 which illustrates the multi-beam scanning optical device of this embodiment, two laser units 1 and 2, which are two light source units (first and second light source units) for composing the light sources of a multi-beam writing optical system, emit laser beams from their light-emitting points 11, 12, 21, and 22, a total of four laser beams $P_{11}$, $P_{12}$, $P_{21}$, and $P_{22}$, which are light beams. Each laser beam is collimated into a parallel beam by a collimator lens 3 or 4, passes through a cylindrical lens 6 and an optical stop 7, strikes a reflecting surface 8a of a rotary polygon mirror 8 provided as a deflecting scanning means, and travels through an fθ lens system 9 as imaging means to have an imaging point on a photosensitive member (member to be scanned) 10 forming an imaging surface on a rotary drum. A sensor 30 is provided for the purpose of determining the writing position of the laser beams. Each laser beam passing through the fθ lens system 9 enters the sensor 30 via a mirror 32 and a lens 31.

Each of the laser beams $P_{11}$, $P_{12}$, $P_{21}$, and $P_{22}$ incident upon the reflecting surface 8a of the rotary polygon mirror 8 is deflected by the polygon mirror 8 to be scanned in a main scanning direction. Each beam moving in the main scanning direction by the rotation of the rotary polygon mirror 8 and moving in a sub-scanning direction by the rotation of the rotary drum forms an electrostatic latent image on the photosensitive member 10.

The cylindrical lens 6 condenses each of the laser beams $P_{11}$, $P_{12}$, $P_{21}$, and $P_{22}$ so that the beam is condensed into a linear shape on the reflecting surface 8a of the rotary polygon mirror 8. The cylindrical lens 6 and the fθ lens system 9 form an optical face tangle error correction system to perform the function of preventing occurrence of an error in positioning of the above-mentioned imaging point in the sub-scanning direction on the photosensitive member 10 due to a face tangle error of the rotary polygon mirror 8. Also, the fθ lens system 9 has the function of correcting the scanning movement of each beam so that the imaging point moves at a constant speed in the main scanning direction on the photosensitive member 10.

Each of the laser beams $P_{11}$, $P_{12}$, $P_{21}$, and $P_{22}$ emitted from the light-emitting points 11, 12, 21, and 22 of the two laser units 1 and 2 first passes through the collimator lens 3 or 4 to be converted into a parallel beam or a predetermined convergent beam. Each of the two laser units 1 and 2 can be rotated for adjustment with respect to the optical box and the position at which each laser unit is mounted can be adjusted as desired.

The laser beams $P_{11}$, $P_{12}$, $P_{21}$, and $P_{22}$ emitted from the two laser units 1 and 2 are combined by a beam combining means 5, travel along paths indicated by a solid line 11a, a dot-dash line 12a, a broken line 21a, and a double-dot dash line 22a, pass through the cylindrical lens 6 and the optical stop 7, and respectively form on the reflecting surface 8a of the rotary polygon mirror 8 linear images extending in a direction corresponding to the main scanning direction (the direction parallel to the surface of the paper).

Each laser beam is deflected by the rotation of the rotary polygon mirror 8 and has an imaging point on the photosensitive member 10 by passing through the fθ lens system 9, with which the photosensitive member 10 is scanned.

Figure 2:
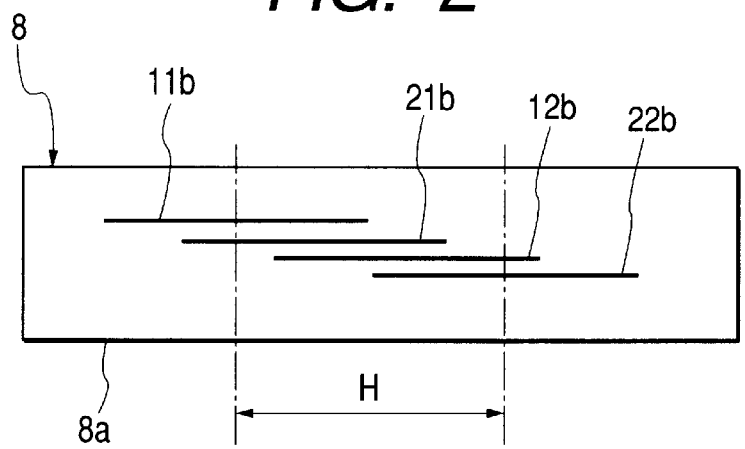
FIG. 2 is a diagram showing the positions of linear images on a rotary polygon mirror reflecting surface in the embodiment shown in FIG. 1.

FIG. 2 shows the arrangement of linear images formed on the reflecting surface 8a of the rotary polygon mirror 8 by the laser beams $P_{11}$, $P_{12}$, $P_{21}$, and $P_{22}$. The linear images formed by the laser beams $P_{11}$, $P_{21}$, $P_{12}$, and $P_{22}$ are schematically illustrated as lines 11b, 21b, 12b, and 22b.

On the reflecting surface of the rotary polygon mirror, the positions of the plurality of light beams generated by the laser unit 1 provided as a first light source unit are different from each other in a direction corresponding to the main scanning direction. The positions of the plurality of light beams generated by the laser unit 2 provided as a second light source unit are also different from each other in a direction corresponding to the main scanning direction.

As shown in FIG. 2, at least one of the light beams generated by the laser unit 2 is located between the plurality of light beams generated by the laser unit 1 in a direction corresponding to the sub-scanning direction.

The linear images 11b and 12b formed by the laser beams $P_{11}$ and $P_{12}$ from the laser unit 1 and the linear images 21b and 22b formed by the laser beams $P_{21}$ and $P_{22}$ from the laser unit 2 are alternately placed side by side in the direction corresponding to the sub-scanning direction.

Also, at least one of the light beams generated by the laser unit 2 is located between the plurality of light beams generated by the laser unit 1 in the direction corresponding to the main scanning direction.

That is, the linear image 21b exists between the linear image 11b and the linear image 12b in the direction corresponding to the main scanning direction.

Further, the center of the linear image 21b exists between the center of the linear image 11b and the center of the linear image 12b in the direction corresponding to the main scanning direction.

If the beams are positioned as described above, the necessary length of the reflecting surface 8a of the rotary polygon mirror 8 can be reduced.

The reason for this effect will be described below.

Figure 3:
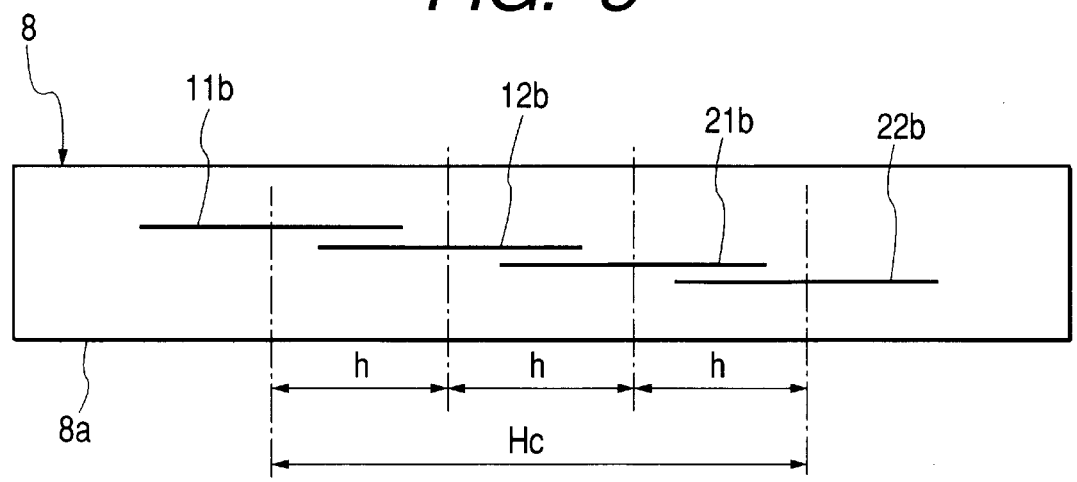
FIG. 3 is a diagram showing the placement of linear images on a rotary polygon mirror reflecting surface in an example of a scanning optical device for comparison with the present invention.

A case will be considered in which, as shown in FIG. 3, the linear images of the laser beams from the two laser units are positioned in series at equal distances without being alternately placed in the direction corresponding to the sub-scanning direction, that is, the linear images 11b, 12b, 21b, and 22b are placed in this order in the main scanning direction. The distance "h" by which the centers of the linear images formed by the laser beams emitted from the laser units 1 and 2 are spaced apart from each other in the direction corresponding to the main scanning direction is expressed by the following equation (1):

$$h = d \times L / f_{col} \quad (1)$$

where "d" is the distance between the light-emitting points 11 and 12 and the distance between the light-emitting points 21 and 22, "$f_{col}$" is the focal length of each of the collimator lenses 3 and 4, and "L" is the distance between the optical stop 7 and the reflecting surface 8a.

Then the distance "$H_c$" between the centers of the linear images 11b and 22b at the opposite ends is shown by $$H_c = 3h = 3 \times d \times L / f_{col} \quad (2)$$

In contrast, in the case where the linear images are alternately placed on top of each other in the direction corresponding to the sub-scanning direction as shown in FIG. 2, each of the distance between the centers of the linear images 11b and 21b and the distance between the centers of the linear images 12b and 22b is h/2 and the distance H between the centers of the linear images 11b and 22b at the opposite ends is expressed by $$H = (3/2) \times h = (3/2) \times d \times L / f_{col} \quad (3)$$

which is much smaller. Thus, the necessary effective length of the reflecting surface 8a of the rotary polygon mirror 8 is markedly reduced, so that a considerable increase in overall size of the rotary polygon mirror 8 can be avoided even if the number of the laser beams is increased.

Figure 4:
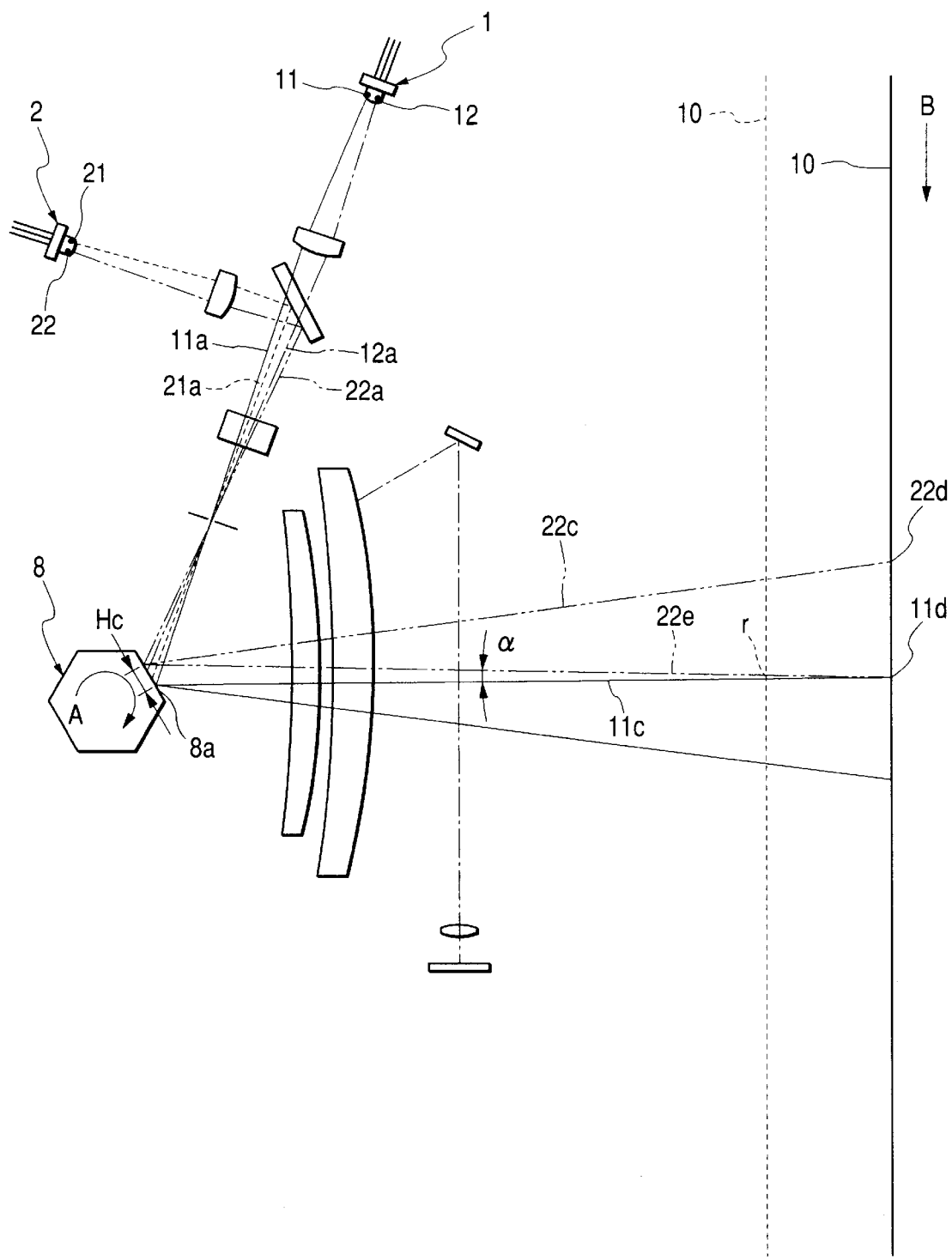
FIG. 4 is a diagram for explaining a focusing error in the comparative example shown in FIG. 3.

A description will be made in more detail with respect to this point. As shown in FIG. 4, the laser beam from the linear image 11b on the reflecting surface 8a of the rotary polygon mirror 8 travels along a path 11c to have an imaging point at a position lid on the photosensitive member 10. At this time, the laser beam from the linear image 22b remotest from the linear image 11b on the reflecting surface 8a travels along a path 22c to have an imaging point located in a position 22d just behind (or on the upstream side) in the main scanning direction indicated by an arrow B. Thereafter, with rotation of the rotary polygon mirror 8 in the direction indicated by the arrow A by a small angle, the laser beam from the linear image 22b travels along a path 22e and has the imaging point moved to the position 11d.

Since, as described above, the centers of the linear image 11b and the linear image 22b on the reflecting surface 8a are spaced by the distance $H_c$ in the direction corresponding to the main scanning direction, it is necessary to increase the necessary length of the reflecting surface 8a of the rotary polygon mirror 8 by the amount corresponding to the distance $H_c$ as compared with that in the single-beam arrangement. Correspondingly, it is necessary to increase remarkably the diameter of the rotary polygon mirror 8 comparing to that in the single-beam arrangement. The increase in size of the rotary polygon mirror 8 is larger as the number of beams is increased.

If the distance between the centers of the linear images is reduced, the size of the rotary polygon mirror 8 can be minimized.

If the photosensitive member 10 moves to, for example, the position indicated by the broken line in FIG. 4 due to a reduction in the positional accuracy with which the photosensitive member 10 and the optical box incorporating the scanning optical device are positioned to be out of focus, then the laser beams $P_{11}$ and $P_{12}$ traveling along the paths 11c and 22e, respectively, have the imaging points spaced apart from each other by a distance "r" on the photosensitive member 10, resulting in a deterioration in image quality. However, if the distance between the centers of the linear images is reduced as described above, the angle "α" between the paths 11c and 22e is small and, naturally, the distance "r" can also be minimized. Thus, the present invention is particularly advantageous in limiting a deterioration in image quality due to instability of focusing.

Since, as in the embodiment, the position of the linear image 21b is different (deviated) from that of the linear image 11b, the same sensor 30 can be used for sensing of the laser beams $P_{11}$ and $P_{21}$, so that the construction of the optical device can be simplified. The same can also be said with respect to the linear images 12b and 22b.

A 4-beam scanning optical system using two laser units each emitting two laser beams has been described. In a case where an "m×n"-beam laser system having "n" laser units each having "m" light-emitting points is used, it is also possible to effectively limit the increase in size of the rotary polygon mirror by inserting, between linear images of "m" laser beams generated by one laser unit, linear images of the laser beams of the other laser units in an overlapping manner along a direction corresponding to the main scanning direction.

Figure 5:
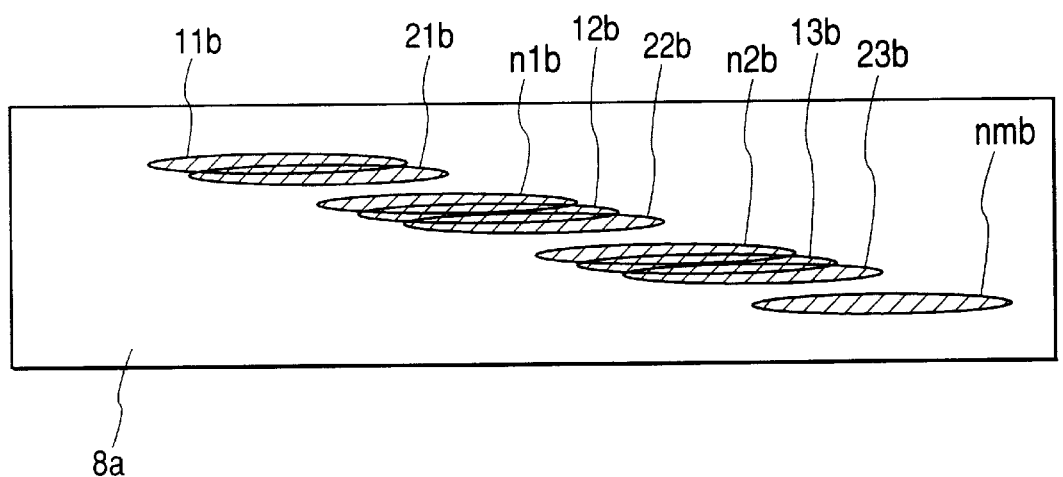
FIG. 5 is a diagram showing the placement of linear images on a rotary polygon mirror reflecting surface in another embodiment of the present invention.

If, as shown in FIG. 5, the linear image formed by the laser beam from the mth light-emitting point of the nth laser unit is expressed as "nmb", the distance $H_A$ between the center of the linear image 11b and the center of the linear image "nmb" is expressed by the following equation (4):

$$H_A = \{(mn-1)/m\} \times d \times L / f_{col} \quad (4)$$

On the other hand, the distance $H_B$ between the centers of the corresponding linear images in a comparative example in which the linear images are positioned in series as shown in FIG. 3 is expressed by the following equation (5):

$$H_B = (mn-1) \times d \times L / f_{col} \quad (5)$$

For example, if the scanning optical device is a 12-beam scanning optical device in which m=4 and n=3, and if d=0.1 mm, L=30 mm, and $f_{col}$=20 mm, then $H_B$=1.65 mm is obtained by the equation (5), while $H_A$ =0.41 mm, which is only ¼ of $H_B$, is obtained by the equation (4).

In FIG. 5, the linear images are expressed as elliptical sections for the purpose of illustrating the overlapping state. The shape of the linear images, however, is substantially the linear shape as shown in FIG. 2 or 3.

Figure 8:
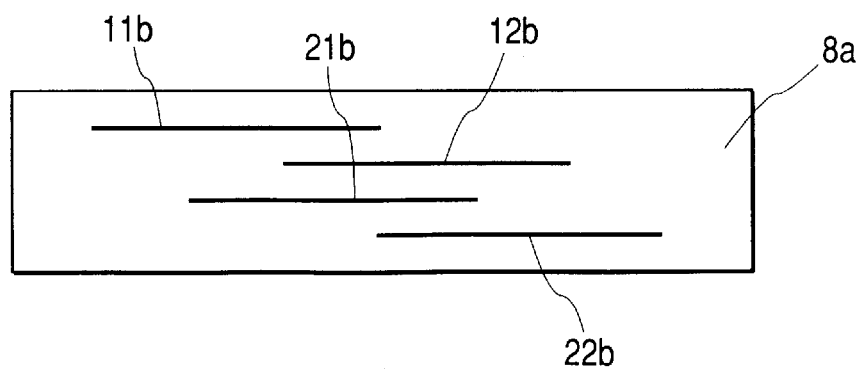
FIG. 8 is a diagram showing the placement of linear images on a rotary polygon mirror reflecting surface in another embodiment of the present invention.

FIG. 8 is a diagram showing respective linear images on the reflecting surface 8a of the rotary polygon mirror in another embodiment of the present invention.

As shown in FIG. 8, a light beam generated by the laser unit 2 is not located between a plurality of light beams generated by the laser unit 1 in a direction corresponding to the sub-scanning direction, but is positioned parallel with the plurality of light beams.

In a direction corresponding to the main scanning direction, at least one of the light beams generated by the laser unit 2 is located between the plurality of light beams generated by the laser unit 1.

That is, the linear image 21b exists between the linear image 11b and the linear image 12b in the direction corresponding to the main scanning direction.

Further, the center of the linear image 21b exists between the center of the linear image 11b and the center of the linear image 12b in the direction corresponding to the main scanning direction.

If the light beams are positioned as described above, the necessary length of the reflecting surface 8a of the rotary polygon mirror 8 can be reduced.

While two light source units each having two light-emitting points are used in the above-described embodiments, a scanning optical device may be arranged which uses a combination of a first laser unit having a plurality of light-emitting points and a second laser unit having at least one light-emitting point, for example, a 3-beam writing optical system using a laser unit having two light-emitting points and another laser unit having one light-emitting point, and in which the laser beam from the single light-emitting point of the second laser unit is inserted between the laser beams from the two light-emitting points of the first laser unit on the reflecting surface of the rotary polygon mirror.

The present invention has been described with respect to the embodiments thereof. However, the present invention is not limited to the above-described embodiments, and various changes and modifications of the embodiments can be made without departing from the technical spirit and scope of the invention.

What is claimed is:

1. A scanning optical apparatus comprising:
a first light source unit for generating a plurality of light beams;
a second light source unit for generating at least one light beam; and
deflecting scanning means for deflecting at a reflecting surface light beams generated by said first light source unit and said second light source unit to scan a member to be scanned,
wherein on the reflecting surface of said deflecting scanning means, positions of the plurality of light beams generated by said first light source unit are different from each other in a scanning direction in which said deflecting scanning means scans, and a position of the at least one light beam generated by said second light source unit is between the positions of the plurality of light beams generated by said first light source unit in the scanning direction.

2. A scanning optical apparatus according to claim 1, wherein the position of the at least one light beam generated by said second light source unit is between the positions of the plurality of light beams generated by said first light source unit in a direction perpendicular to said scanning direction.

3. A scanning optical apparatus according to claim 1, wherein the position of the at least one light beam generated by said second light source unit is not between the positions of the plurality of light beams generated by said first light source unit, but is juxtaposed to the positions of the plurality of light beams, in a direction perpendicular to said scanning direction.

4. A scanning optical apparatus according to claim 1, wherein said second light source unit generates a plurality of light beams.

5. A scanning optical apparatus according to claim 1, wherein each of said first light source unit and said second light source unit generates two light beams.

6. A scanning optical apparatus according to claim 1, wherein said deflecting scanning means comprises a rotary polygon mirror.

7. An image forming apparatus comprising:
a member to be scanned;
a first light source unit for generating a plurality of light beams;
a second light source unit for generating at least one light beam; and
deflecting scanning means for deflecting at a reflecting surface the light beams generated by said first light source unit and said second light source unit to scan said member to be scanned,
wherein on the reflecting surface of said deflecting scanning means, positions of the plurality of light beams generated by said first light source unit are different from each other in a scanning direction in which said deflecting scanning means scans, and a position of the at least one light beam generated by said second light source unit is between the positions of the plurality of light beams generated by said first light source unit in the scanning direction.

8. An image forming apparatus according to claim 7, wherein the position of the at least one light beam generated by said second light source unit is between the positions of the plurality of light beams generated by said first light source unit in a direction perpendicular to said scanning direction.

9. An image forming apparatus according to claim 7, wherein the position of the at least one light beam generated by said second light source unit is not between the positions of the plurality of light beams generated by said first light source unit, but is juxtaposed to the positions of the plurality of light beams, in a direction perpendicular to said scanning direction.

10. An image forming apparatus according to claim 7, wherein said second light source unit generates a plurality of light beams.

11. An image forming apparatus according to claim 7, wherein each of said first light source unit and said second light source unit generates two light beams.

12. An image forming apparatus according to claim 7, wherein said deflecting scanning means comprises a rotary polygon mirror.

* * * * *

UNITED STATES PATENT AND TRADEMARK OFFICE
CERTIFICATE OF CORRECTION

PATENT NO. : 6,628,444 B2  Page 1 of 1
DATED : September 30, 2003
INVENTOR(S) : Junya Azami It is certified that error appears in the above-identified patent and that said Letters Patent is hereby corrected as shown below:

Column 6,
Line 18, "lid" should read -- 11*d* --.

Signed and Sealed this

Twenty-fourth Day of February, 2004

JON W. DUDAS
*Acting Director of the United States Patent and Trademark Office*